United States Patent Office 3,230,054
Patented Jan. 18, 1966

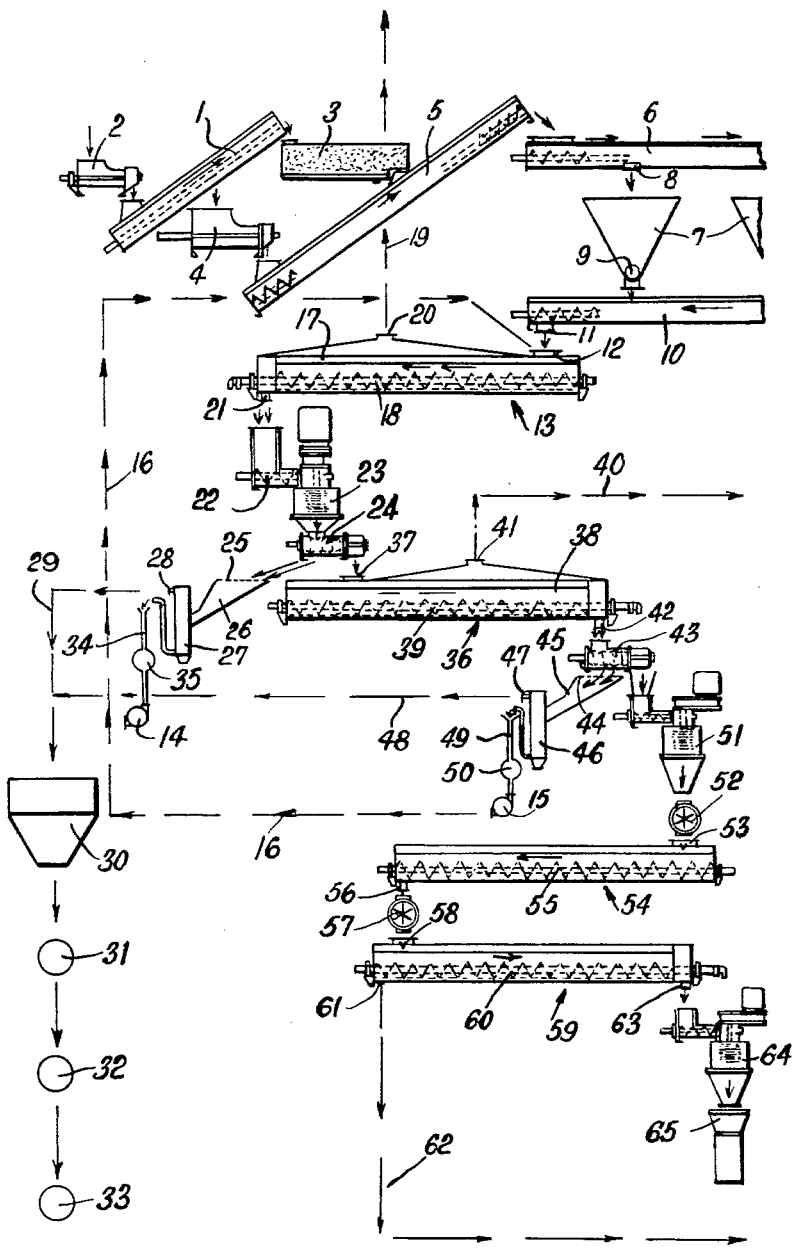

3,230,054
APPARATUS FOR RENDERING OILS AND FATS FROM SOLID OIL-BEARING MATERIALS
Thomas S. Ling, Leven, Fife, Scotland, assignor to George Scott & Son (London) Limited, London, England, a company of Great Britain
Filed Dec. 12, 1961, Ser. No. 158,764
4 Claims. (Cl. 23—280)

This invention relates to a process and apparatus for rendering oils and fats from solid oil-bearing materials such as animal bone, meat or fat material, fish offal, vegetable oil bearing materials, and the like.

It has been proposed, heretofore, to render oils and fats from solid oil-bearing material by pre-crushing the material, which may be in the form of fallen animal carcasses, butchers' scraps, offal, condemned carcasses, oil-bearing fish, fish offal or the like, to reduce the dimensions of the material to manageable proportions, and by feeding the crushed matter into a rendering vessel batch by batch, each batch of material being treated in the vessel until completion of the rendering process, which usually requires several hours, whereupon the product is discharged, usually manually, and passed on to an expeller or centrifuge for the further partial removal of oil, whence the solid material may be passed to a solvent extraction plant for the recovery of residual oil from the material.

The rendering vessel customarily consists of a horizontal cylindrical steam-jacketed vessel or cooker provided with a horizontal shaft carrying paddles rotatable continuously to move the material around in the vessel or cooker. The vessel or cooker may hold up to four tons of material per batch and power means of up to fifty horse-power may be required to rotate the paddles. As the vessel or cooker may require to be operated for several hours to complete the cooking, it is necessary usually, when reasonable economic quantities of oil-bearing materials are to be handled, to provide a plurality of cookers which may occupy a large amount of space and require the provision of considerable power.

It has also been proposed to extract oil and fats from fleshy material by subjecting the material to alternating pressure and to heat while being conveyed along open troughs submerged in liquid, heat being supplied by steam or hot water sprayed on to material passing along the troughs. A disadvantage of this prior proposal is that oil can be extracted satisfactorily from fleshy material only and not from hard materials, such as green bones, as the hard materials tend to jam and to block the troughs, nor from stringy or sinewy materials such as gut and the like, as such material also tends to cause blockages especially where an interruption, or a change of direction, occurs in a screw conveyor.

The primary object of the present invention is to provide for the rendering of oils and fats from solid oil-bearing materials in bulk in such manner that oils, fats and the like may be extracted continuously from the material, which may include green bones and the like, with consequent saving in power, space, and labour.

The process according to the invention comprises the steps of pre-crushing solid oil-bearing material, passing the crushed material through a first heat-exchanger provided with means for conveying the material continuously through the exchanger in which the material is subjected to a preliminary heat treatment, passing the material through a disintegrator for further reduction of the material, passing the material through a second heat-exchanger provided with means for conveying the material continuously through the exchanger, and passing the material through a press in which fats and oils in the cells of the material ruptured in the disintegrator are expressed from said material.

Apparatus, according to the invention, comprises in series means for pre-crushing the material, a first heat-exchanger provided with means for conveying the material continuously through the heat-exchanger, a disintegrator, a second heat-exchanger provided with means for conveying the material continuously through said second heat-exchanger, and a press for expressing fats and oil from the cells of the material ruptured in the disintegrator.

The accompanying drawing is a schematic view of one form of apparatus for performing the process according to the invention.

Referring to the drawing, 1 denotes a screw conveyor to which is fed directly hard solid oil-bearing material, such as fallen animal carcasses and condemned carcasses including green bones and the like. If soft solid oil-bearing material, such as gut, oil-bearing fish, fish offal or the like is to be rendered, the soft material is fed first to a hasher 2 and thence to the conveyor 1 whence it may be fed through the apparatus alone or mixed with the solid material. It will be understood that the references hereinafter to "material" alone cover either solid or soft material or cover a mixture of both materials.

3 denotes a washer to which soft material is fed from the conveyor 2. 4 denotes a pre-breaker to which solid material is fed from the conveyor 1 to be pre-crushed. 5 denotes a second screw conveyor for conveying material from the washer 3 or/and from the pre-breaker 4 to a third screw conveyor 6. 7 denotes each of a plurality of bins each of which is so disposed below the conveyor 6 as to receive a batch of material through a port 8 (one only of which is illustrated) in the base of the conveyor 6. 9 denotes a valve (one only of which is illustrated) in each bin for controlling flow of material to a fourth screw conveyor 10 located below the bins 7. The base of the conveyor 10 is provided with a port 11 through which material is discharged to an inlet port 12 at one end of a heat-exchanger 13. If desired, particularly where the material to be rendered is solid material, water from pumps 14, 15 is fed as indicated by arrows 16 to the exchanger 13 for mixing with the material.

The exchanger 13 comprises a jacketed trough 17 in which a hollow heated screw conveyor 18 is rotatable by a variable speed drive. Vapour from the exchanger 13 escapes as indicated by arrows 19 through a port 20 in the exchanger 13.

An outlet port 21 in the other end of the exchanger 13 leads to a feeder 22 associated with a disintegrator 23 in which the material is reduced to a size and a condition to be treated in a press 24 below the disintegrator 23, the press 24 serving to express water, fats and oils from the material. Located below the press 24 is a vibratory screen 25 on which are discharged from the press 24 fats, oil and water and possibly some solid matter such as meat and bones. A funnel 26 leads from the screen 25 to a separator 27 for separating water from fats and oil. The separator 27 is formed at the top with an outlet 28 for discharge from the separator 27, in the direction indicated by arrows along conduit means 29, of fats and oil which are directed to a recovery means in the form of a settling tank 30, thence to a decanter 31, thence to a tank 32 containing acid for treatment of the fats and oil and thence to a polisher 33. An outlet near the bottom of the separator 27 for discharge of water from the separator 27 leads by way of a duct 34 and a tank 35 to the pump 14.

Also located below the press 24 is a second heat-exchanger 36 having at one end an inlet port 37 to which is discharged from the press 24 material passing through the press and not discharged to the screen 25.

The exchanger 36 is similar to the exchanger 13 and comprises a jacketed trough 38 in which a hollow heated screw conveyor 39 is rotatable by a variable speed drive. Vapour from the exchanger 36 escapes as indicated by arrows 40 through a port 41 in the exchanger 36. An outlet port 42 in the other end of the exchanger 36 leads to a press 43, similar to the press 24, serving to express substantially all the residue of oil, fats and water in the material. Located below the press 43 is a vibratory screen 44 on to which are discharged fats, oil and water and possible some solid matter such as meat and bones. A funnel 45 leads from the screen 44 to a separator 46 for separating water from the fats and oil. The separator 46 is formed at the top with an outlet 47 for discharge from the separator 46, in the direction indicated by the arrows 48, of fats and oil to the tank 30. An outlet near the bottom of the separator 46 for discharge of water from the separator 46 leads by way of a duct 49 and a duct 50 to the pump 15.

Also located below the press 43 is a disintegrator 51 discharging by way of a sealing valve 52 to an inlet 53 in one end of a steriliser 54 provided with a screw conveyor 55. The steriliser 54 is optional and is usually provided when required under health regulations or the like. The other end of the steriliser 54 is provided with an outlet 56 discharging by way of a sealing valve 57 to an inlet 58 in one end of a dryer 59 provided with a screw conveyor 60 and with an outlet 61 for flow of vapour, in the direction indicated by arrows 62, from the dryer 59. The other end of the dryer 59 is provided with an outlet 63 discharging to a disintegrator 64 leading to a sack filling and weighing machine 65.

In practice, solid material or/and soft material previously passed through the hasher 2 is or are fed to the conveyor 1. Solid material passes from the conveyor 1 through the pre-breaker 4 to the conveyor 5; soft material passes from the conveyor 1 through the washer 3 to the conveyor 5. The material is conveyed to the conveyor 6 whence the material is discharged in batches through the ports 8 to the associated bins 7. Actuation of the valves 9 permits flow of material from the bins 7 to the conveyor 10 and thence through the port 11 to the inlet port 12 of the exchanger 13 where the material may, if desired, be mixed with water from the pumps 14, 15. The material is then conveyed through the exchanger 13 to the disintegrator 23 and thence to the press 24 where a large proportion of fats, oil and water are expelled to the screen 25 from cells of the material ruptured in the disintegrator 23. As a small proportion of the material may pass from the press 24 to the screen 25, vibration of the screen causes said material to be discharged from the screen for further processing and fats, oil and water to flow through the funnel 26 to the separator whence fats and oil are separated from the water which flows through the duct 34 and the tank 35 to the pump 14, fats and oil being discharged through the outlet 28 for further processing in the tank 30, the decanter 31, the tank 32 and the polisher 33.

The residue of the material flows through the press 24 to the inlet port 37 of the exchanger 36 through which the material is conveyed through the outlet port 42 to the press 43 for further extraction of fats, oil and water from the ruptured cells of the material. The extracted fats and oils and possibly a small proportion of the material, are expelled on to the vibratory screen 44 which causes fats, oil and water to flow through the funnel 45 to the separator 46 and said material to be discharged for further processing. Fats and oil are separated from water in the separator 46 and are discharged through the outlet 47 to flow in the direction indicated by the arrows 48 for further processing with fats and oil discharged from the separator 27. Water flows from the separator 46 through the duct 49 and the tank 50 to the pump 15.

Material in the press 43 flows to the disintegrator 51 for further disintegration of the material. The disintegrated material then flows from the disintegrator 51 through the sealing valve 52 to the steriliser 54, is conveyed through the steriliser to the outlet 56, flows through the sealing valve 57 to the dryer 59, is conveyed through the dryer 59 to the outlet 63 and flows to the disintegrator 65 for disintegration and rendering into, for example, meal such as bone meal or/and fish meal. The material is discharged from the disintegrator into the sack filling and weighing machine 65.

It has been found that the amount of fats and oils remaining in material rendered by the known processes is of the order of 10% to 14%. In accordance with the process and the apparatus of the present invention, the amount of fats and oils remaining in the rendered material is less than 6%. The addition of water to the material entering the heat-exchanger 13, which water displaces oils and fats from the cells of the material ruptured in the disintegrator, and the use of the presses 24, 43 obviates the necessity for expressing or separating the oils and the fats by expellers or centrifugal separators or/and extraction with solvents which are usually expensive and may be dangerous or harmful in use. Furthermore, it has been discovered that the pressing in two stages is desirable in that the press 24 in the first stage expresses from the material a large percentage of the fats, oil and water remaining in the material after the material has passed through the press 24 assisting in the displacement in the press 43 of the second stage of the oils and fats from the ruptured cells of the material.

The temperature in each of the heat-exchangers 13, 36 will vary according to the material being handled, but it is undesirable to use high temperatures for heating the material durin gthe rendering process. The temperature in each of the heat-exchangers is preferably maintained below that required by the known processes, and may be below 100° C. for fish, fish offal, butchers, scraps, oil-bearing vegetable materials and the like. The screw conveyors 18, 39 are preferably of the kind disclosed in the prior British applications Nos. 39,517/56 and 2,265/59. The steriliser 54, when provided, ensures complete sterilisation of the rendered material. A few minutes only are required for the material to pass through each of the heat-exchangers 13, 36 thus maintaining oxidation and discolouration of the material at a minimum, and resulting in the production of a tallow or fat which is lighter in colour and lower in free fatty acids, a residual meal which is higher in protein, and a considerable reduction in power and heat requirements, as compared with the known processes.

What I claim is:

1. Apparatus for rendering oils and fats from solid oil-bearing materials, comprising in series a pre-breaker for pre-crushing the solid materials to be treated, a first heat exchanger, means for conveying the pre-crushed material continuously through the heat exchanger, a disintegrator, a first press means arranged to express from the material discharged from the disintegrator liquid in the form of water and a substantial percentage of fats and oils in the cells of the material ruptured in the disintegrator, separating means for receiving liquid discharge from said press means for separating water from fats and oils, conduit means connected to said separating means for recovering said fats and oils, a second heat exchanger connected to the solids discharge of the first press means to receive the solids discharged from the first press means for conveying the material continuously through said second heat-exchanger, and a second press means connected to the second heat exchange arranged to express further fats and oils from the cells of the material discharged from the second heat exchanger, recovery means collecting the fats and oils from the conduit means and the second press means.

2. Apparatus for rendering oils and fats from solid oil-bearing materials, comprising in series a pre-breaker for pre-crushing the solid materials to be treated, a first heat exchanger, means for conveying the pre-crushed material continuously through the first heat-exchanger, means for adding water to the material in the first heat exchanger, a disintegrator, a first press means arranged to express from the material discharged from the disintegrator a substantial percentage of the water with fats and oils from cells of the material ruptured in the disintegrator, means associated with said first press for separating the water from the fats and oils, a pump for pumping the separated water to the first heat exchanger, a second heat exchanger, means for conveying the material continuously through said second heat exchanger, a second press means arranged to express further water with fats and oils from the cells of the material discharged from the second heat exchanger, means associated with said second press for separating the water from the fats and oils, and a pump for pumping the separated water to the first heat exchanger.

3. Apparatus as claimed in claim 2, in which each of said first and second heat exchangers comprises a trough jacketed against loss of heat therefrom, a hollow heated screw conveyor mounted within said trough, and variable speed drive means for driving said screw conveyor.

4. Apparatus as claimed in claim 2, including a steriliser for sterilising the products expressed from the second press, the steriliser comprising a trough jacketed against loss of heat therefrom, a hollow heated screw conveyor mounted within said trough, and variable speed drive means for driving said screw conveyor.

References Cited by the Examiner
UNITED STATES PATENTS

| | | | |
|---|---|---|---|
| 707,854 | 8/1902 | Lundeberg | 260—412.2 |
| 2,455,374 | 12/1948 | Libbey et al. | 260—412.6 |
| 2,467,529 | 4/1949 | Hormel | 260—412.6 |
| 2,493,459 | 1/1950 | Koppit | 260—412.6 |
| 2,551,042 | 5/1951 | Nyrop | 23—280 |
| 2,681,270 | 6/1954 | Noble | 23—280 |
| 2,745,856 | 5/1956 | Dayen et al. | 260—412.6 |
| 2,875,222 | 2/1959 | Dormitzer | 260—412.6 |
| 2,911,421 | 11/1959 | Greenfield | 260—412.6 |
| 3,063,840 | 11/1962 | Sullivan | 260—412.6 X |

MORRIS O. WOLK, *Primary Examiner.*

ABRAHAM H. WINKELSTEIN, DANIEL D. HOROWITZ, *Examiners.*